(12) United States Patent
Fraser et al.

(10) Patent No.: US 11,661,358 B2
(45) Date of Patent: May 30, 2023

(54) SYSTEMS AND METHODS FOR DESALINATING WATER

(71) Applicant: Reverse Ionizer Systems, LLC, Bethesda, MD (US)

(72) Inventors: Desmond A. Fraser, Herndon, VA (US); Hossein Ghaffari Nik, Fairfax, VA (US); Richard B. McMurray, Fairfax, VA (US); Akrem Hassen Adem Aberra, Fairfax, VA (US); Shelley Marie Grandy, Ashburn, VA (US); Patrick J. Hughes, Vienna, VA (US)

( * ) Notice: Subject to any disclaimer, the term of this patent is extended or adjusted under 35 U.S.C. 154(b) by 1043 days.

(21) Appl. No.: 16/066,911

(22) PCT Filed: Jul. 6, 2017

(86) PCT No.: PCT/US2017/040838
§ 371 (c)(1),
(2) Date: Jun. 28, 2018

(87) PCT Pub. No.: WO2018/009616
PCT Pub. Date: Jan. 11, 2018

(65) Prior Publication Data
US 2020/0277209 A1 Sep. 3, 2020

Related U.S. Application Data

(60) Provisional application No. 62/358,568, filed on Jul. 6, 2016.

(51) Int. Cl.
*C02F 1/48* (2006.01)
*C02F 1/46* (2023.01)
(Continued)

(52) U.S. Cl.
CPC ............ *C02F 1/487* (2013.01); *C02F 1/4602* (2013.01); *C02F 1/4604* (2013.01); *C02F 5/02* (2013.01);
(Continued)

(58) Field of Classification Search
CPC ................. C02F 1/48; C02F 1/46; C02F 5/02
See application file for complete search history.

(56) References Cited

U.S. PATENT DOCUMENTS 5,173,169 A    12/1992  Garrison et al.
5,422,481 A     6/1995  Louvet
(Continued)

FOREIGN PATENT DOCUMENTS

WO    WO-2008062171 A1 *  5/2008  .............. C02F 1/463

OTHER PUBLICATIONS

Cho et al., "Mitigation of Calcium-Carbonate Fouling Using RF Electric Fields", Proc. of Intl. Conf. on Heat Exchange Fouling and Cleaning VIII, pp. 384-391, Jun. 2009, Austria.
(Continued)

*Primary Examiner* — Walter D. Griffin
*Assistant Examiner* — Cameron J Allen
(74) *Attorney, Agent, or Firm* — Capitol Patent & Trademark Law Firm, PLLC

(57) ABSTRACT

Plasma discharges and electromagnetic fields may be applied to a liquid, such as water, for desalinization purposes and to treat unwanted material in the liquid.

3 Claims, 8 Drawing Sheets

(51) Int. Cl.
*C02F 5/02* (2023.01)
*C02F 103/08* (2006.01)

(52) U.S. Cl.
CPC .... *C02F 2103/08* (2013.01); *C02F 2301/026* (2013.01); *C02F 2303/04* (2013.01)

(56) References Cited

U.S. PATENT DOCUMENTS

| | | |
|---|---|---|
| 5,667,677 A | 9/1997 | Stefanini |
| 5,738,766 A | 4/1998 | Jefferson |
| 2001/0035342 A1 | 11/2001 | Morse et al. |
| 2006/0196817 A1 | 9/2006 | Crewson et al. |
| 2007/0120563 A1 | 5/2007 | Kawabata et al. |
| 2008/0264800 A1 | 10/2008 | Schlager et al. |
| 2009/0206974 A1 | 8/2009 | Meinke |
| 2012/0217815 A1 | 8/2012 | Clark |
| 2013/0146464 A1 | 6/2013 | Shiga |
| 2015/0143918 A1 | 5/2015 | Schaefer et al. |
| 2015/0344335 A1* | 12/2015 | Hughes ............ H05B 6/62 204/663 |
| 2016/0016829 A1* | 1/2016 | Hughes ............ C02F 1/487 204/663 |

OTHER PUBLICATIONS

Jiang, Wenbin, et al., "Effectiveness and Mechanisms of Electromagnetic Field on Reverse Osmosis Membrane Scaling Control During Brackish Groundwater Desalination", Separation and Purification Technology, Sep. 2021, pp. 1-13.

Huchler, Loraine, et al., "Can Onsite qPCR Testing Improve Management of Legionella Infections from Cooling Towers?", the Analyst, Summer 2021, vol. 28, No. 3, pp. 9-18.

* cited by examiner

SYSTEMS AND METHODS FOR DESALINATING WATER

RELATED APPLICATIONS

This application is related to, and claims the benefit of priority from, U.S. Provisional Application No. 62/358,568 filed Jul. 6, 2016 (the "'568 Application").

This application is related to U.S. patent application Ser. No. 15/069,971 filed Mar. 15, 2016 (the "'971 Application"), Ser. No. 14/979,501 filed Dec. 27, 2015, ("'979 Application"), U.S. patent application Ser. No. 14/821,604 filed Aug. 7, 2015, ("'604 Application"), U.S. patent application Ser. No. 14/820,550 filed Aug. 6, 2015 ("'550 Application"), U.S. patent application Ser. No. 14/624,552 filed Feb. 17, 2015 ("'552 Application"), U.S. patent application Ser. No. 14/170,546 filed Jan. 31, 2014 ("'546 Application") and U.S. Provisional Patent Application No. 61/759,345 filed Jan. 31, 2013 ("'345 Application"). The present application incorporates by reference herein the entire disclosures of the '568, '971, '979, '604, '550, '552, '546 and '345 Applications, including their text and drawings, as if set forth in their entirety herein.

INTRODUCTION

Reverse osmosis (RO) desalination plants are now the leading method to recover portable water from seawater, inland brackish water and river water. Mineral scale management in seawater, inland brackish water and river water inland desalination plants is a major challenge given the challenges to clean the RO membranes clean. Optimal portable water recovery levels are highly dependent on keeping the RO membranes clean.

The costs associated with operating desalination plants are typically high, given the required high levels of potable water recovery, typically about 85%-95% recovery from seawater, inland brackish water, and river water.

As the RO's permeate recovery level increases, the level of solute concentration at the membrane surface relative to the bulk rises. Thus, increasing the propensity for membrane fouling and scaling on the RO membranes. Mineral scaling occurs when the concentrations of sparingly soluble dissolved mineral salts such as calcium sulfate ($CaSO_4$), barium sulfate ($BaSO_4$), strontium sulfate ($SrSO_4$), calcium carbonate ($CaCO_3$), silicon dioxide ($SiO_2$), etc., near the membrane surfaces rise above their solubility limits.

The mineral scale fouling leads to a significant reduction in membrane performance such as flux reduction and salt rejection impairment, and shortening of membrane life, which increases the process cost and imposes operational limits on the achievable portable water recovered. Consequently, the feed water of desalinization plants (seawater, inland brackish water, and river water) is conditioned to mitigate mineral scale formation with antiscalant chemical treatment to reduce mineral salt crystallization. The antiscalant chemical treatment also allows for an effective cleaning of the RO membranes by applying osmotic backwashing, and feed water flow reversal.

DETAILED DESCRIPTION, WITH EXAMPLES

Figure 1A:
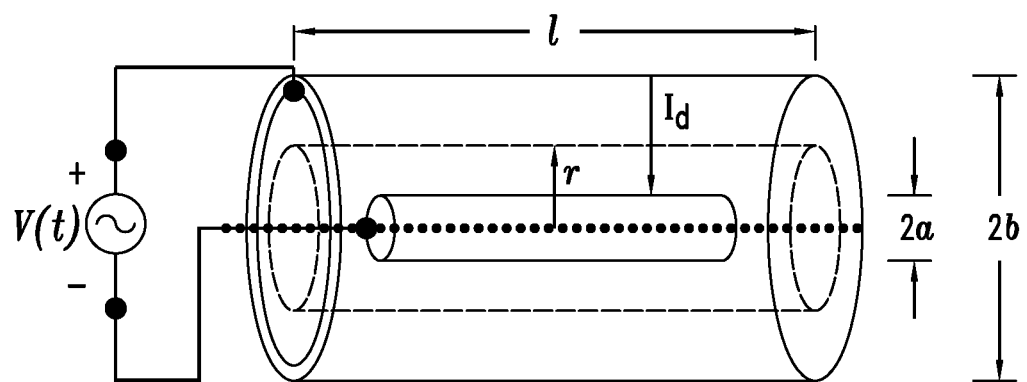
FIG. 1A depicts an exemplary electromagnetic probe according to an embodiment of the invention.

Exemplary embodiments of devices, systems and related methods for treating liquids are described herein and are shown by way of example in the drawings. Throughout the following description and drawings, like reference numbers/characters refer to like elements.

It should be understood that, although specific exemplary embodiments are discussed herein, there is no intent to limit the scope of the present invention to such embodiments. To the contrary, it should be understood that the exemplary embodiments discussed herein are for illustrative purposes, and that modified and alternative embodiments may be implemented without departing from the scope of the present invention.

It should also be noted that one or more exemplary embodiments may be described as a process or method. Although a process/method may be described as sequential, it should be understood that such a process/method may be performed in parallel, concurrently or simultaneously. In addition, the order of each step within a process/method may be re-arranged. A process/method may be terminated when completed, and may also include additional steps not included in a description of the process/method.

As used herein, the term "and/or" includes any and all combinations of one or more of the associated listed items. As used herein, the singular forms "a," "an" and "the" are intended to include the plural form, unless the context and/or common sense indicates otherwise.

As used herein, the term "embodiment" refers to an example of the present invention.

As used herein the phrase "unwanted material" includes all types of material, in dissolved or undissolved form, which degrades or otherwise detracts from a desired quality of a liquid, such as water. A non-limiting list of unwanted material includes, but is not limited to: scale, microbes (including, but not limited to bacteria), corrosive minerals, and contaminants of all kinds.

As used herein the phrases "treat", "treating," "treatment" and other tenses of the word treat mean the mitigation, reduction, removal, minimization, dissolution and elimination of unwanted material and the prevention of such unwanted material. Further the phrases "treating a liquid" and "treating unwanted material" and their other tenses may be used synonymously herein to describe the treatment of a liquid that contains unwanted material, such as scale forming ions or salt-based impurities.

The phrase "liquid" means any known fluid that may be typically involved in, but not limited to, irrigation, cooling and heating processes, energy exploration, or the transport of minerals, for example. One non-limiting example of a fluid is water, where by "water" is meant, but is not limited to, non-potable water, potable water and water that contains a combination of natural and man-made chemicals and minerals.

When used herein the phrases "probe", "probe device" or sometimes "inventive device" or just "device" means one of the inventive devices described herein that may be used to treat a liquid that contains unwanted material.

It should be understood that when the description herein describes the use of a "microcontroller", "controller", "computing device" or "computer" that such a device includes stored, specialized instructions for completing associated, described features and functions. Such instructions may be stored in onboard memory or in separate memory devices. Such instructions are designed to integrate specialized functions and features into the controllers, microcontrollers, computing devices, or computer that are used to complete inventive functions, methods and processes related to treating a liquid that contains unwanted material by controlling one or more inventive systems or devices/elements/components used in such a treatment.

It should be understood that the phrase "integrated" means one or more elements or components that are constructed substantially as one unitary device where, generally speaking, the elements or components are connected using short conductors or connectors, are placed on one or more adjacent printed circuit boards or the like that are themselves connected or are formed as one or more miniaturized integrated circuits.

An Exemplary Probe Electric Field Antenna and Magnetic Field Antenna

An exemplary magnetic field antenna provided by the present invention may be configured as an electrically small loop antenna with a circumference that corresponds to some fraction of a wavelength of the maximum operating frequencies.

The output voltage and correspondingly the magnetic field produced by the transmitting magnetic field loop antenna gain increases by adding turns. The additional turns increases the inductance of the loop antenna.

At higher frequencies, the increased inductance results in a substantial antenna output impedance, which produces mismatch coupling. Further, the increase in inductance leads to resonant modes within the operating frequency ranges. These resonant modes can reduce the magnetic field antenna's bandwidth performance response. The impedance matching circuitry reduces the magnetic field antenna's impedance mismatch with the broadband electromagnetic generator.

Figure 3:
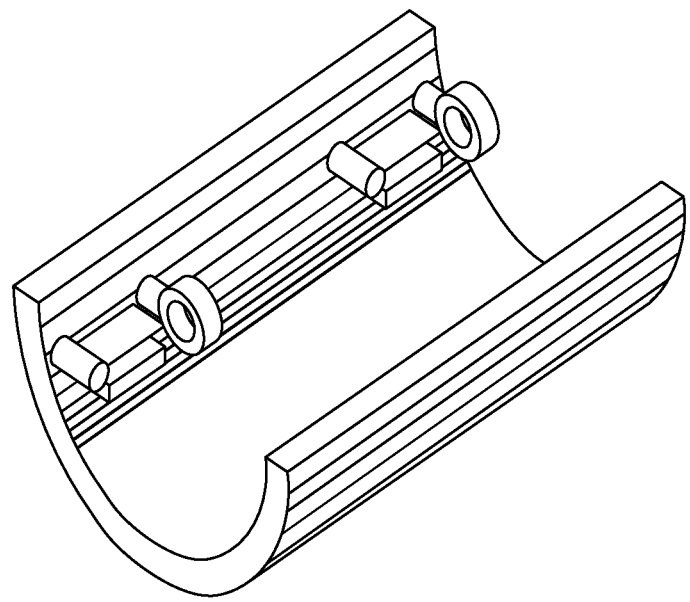
FIG. 3 depicts an exemplary internal structure of a loop antenna or section according to an embodiment of the invention.

FIG. 3 depicts an exemplary internal structure of a loop antenna or section according to embodiments of the invention. As depicted a loop antenna with circumference (R), $\frac{1}{8} \lambda < R < \frac{1}{3} \lambda$, where r is the radius of the coil and $\lambda$ is the wavelength of the carrier frequency. The magnetic field strength at the center of the loop at distance z can be determined using Biot-Savart's Law $$B = \frac{\mu_0 I}{4 j r^2} \int dL = \frac{\mu_0 I}{2r}$$

where $\mu_0$ is the permeability of free space, (I) is the current flowing through the loop, and (r) is the radius of the loop. Since the loop is electrical small, the current within the loop can be approximated across the loop as constant.

An Exemplary Electric Field—Magnetic Field Desalination Probe System

The inventive systems described herein and in the related applications incorporated by reference herein (sometimes referred to as the Electric field—Magnetic field Desalination Probe System or "E×B Desal Probe System" for short) may be used by desalinization plants to reduce the use of anti-scalant chemicals. The E×B Desal Probe System changes the morphology of precipitated mineral scale from hard scale to soft scale present in seawater, inland brackish water, and river water desalination plants and allows for an effective cleaning of the RO membranes with osmotic backwashing, and feed water flow reversal.

An E×B-Desal Probe system operating above the waveguide cut-off frequencies with multiple carrier frequencies (for example, 900-928 MHz and 1800-1850 MHz, 2.4-2.48 GHz and 5.7-5.8 GHz, etc.) of a desalination plant's circular piping system, E×B-Desal Probe Systems provided by the present invention can propagate many of the TE (Transverse Electric) and TM (Transverse Magnetic) dominant and higher order Bessel function modes (for example, but not limited to $TE_{01}$, $TE_{02}$, $TE_{03}$, $TE_{11}$, $TM_{12}$, $TE_{21}$, $TE_{23}$, $TE_{31}$, $TE41$, $TE_{51}$, $TE_{61}$, $TE_{81}$, $TM_{01}$, $TM_{02}$, $TM_{03}$, $TM_{11}$, $TM_{12}$, $TM_{13}$, $TM_{21}$, $TM_{22}$, $TM_{31}$, $TM_{32}$, $TM_{51}$, $TM_{61}$, etc.) to treat the scaling ions within very long pipes dependent of the number of carrier frequencies configured.

The advantage of the E×B-Desal Probe Systems provided by the present invention is that the radio frequency power attenuation losses associated with the carrier signals from such systems are low and are in the order of approximately 1 dB/100 meters to 2 dB/100 meters within the desalination plant's circular piping systems and they propagate much longer distances as a result of the carrier wavelengths being significantly smaller than the diameter pipes used in desalination piping system.

The TE (Transverse Electric) and TM (Transverse Magnetic) dominant and higher order Bessel function modes achieve higher efficiencies in mitigating mineral scale because there are multiple carriers acting to soften the morphology of the precipitated mineral scale in long pipe system installations than would otherwise be possible operating with a single mode operating frequency in desalination plants with circular piping systems.

Additionally, E×B-Desal Probe Systems provided by the present invention reduce the precipitation of supersaturated salts within feed water by targeting the scaling ions with their ionic cyclotron frequency (ICF). The targeting of the scaling ions keeps the scaling ions in a cycloid movement and weakens their precipitation from a hard needle-like crystalline form of mineral scale to a softer form that does not stick to the RO membranes and reduces the pressure on their surfaces and stops the RO pipes from being clogged.

Theory of Operation

The E×B-Desal Probe System consists of a Broadband Electromagnetic Generator (BEG) section and a Probe 50-ohm impedance matching section. The BEG has four (4) 50-ohm impedance ports, which applies 500 Watts of radio frequency power to each of the four (4) input port on the Probe's 50-ohm impedance matching section. There are two (2) ports for the electric field antennas and two ports for the magnetic field antennas on the Probe's 50-ohm impedance matching section. Short 50-ohm impedance coaxial transmission line cables connect the BEG section to the Probe's 50-ohm impedance matching section. The result is an applied Electro-Motive Force (EMF), hereafter referred to as the applied Voltage (V), of 158 Vrms on each of the ports. The applied Voltages (V) are sine waves with carrier operating frequencies that are combined as follows; 900-928 MHz and 1800-1850 MHz, 2.4-2.48 GHz and 5.7-5.8 GHz modulated with the ICF of the scaling ions in the feed water.

The Probe's 50-ohm impedance matching circuitry allows the E×B-Desal Probe System to maintain a 50-ohm input impedance at the following operating frequencies; 900-928 MHz and 1800-1850 MHz, 2.4-2.48 GHz and 5.7-5.8 GHz. The Probe's 50-ohm impedance matching circuitry maintains a 50-ohm impedance match as the conductivity of the desalinization plant's feed water varies, which without the 50-ohm impedance matching circuitry would have resulted in a mismatch between the BEG's output impedance and the Probe's input impedance, while processing feed water to portable water. The Probe's 50-ohm impedance matching circuitry can match the BEG output impedance, the short coaxial transmission line cable impedance, and the Probe's 50-ohm impedance at the resonance frequencies of 900-928 MHz, 1800-1850 MHz, 2.4-2.48 GHz and 5.7-5.8 GHz.

The Probe's complex impedance (Z) is the sum of a resistive component (R), an inductive reactance component (jωL) and/or a capacitive reactance component (1/jωC) where $$Z=R+j\omega L+1/j\omega C$$

The Probe's 50-ohm impedance circuitry is designed to cancel the inductive and/or capacitive reactance components so that the only remaining portion of the impedance (Z) is the 50-ohm resistive component. A 50-ohm, matched BEG, coaxial transmission line cable, and Probe impedance guarantees maximum radio frequency power (forward power) to the Probe and in turn, very low reflected power to the BEG. When forward power from the BEG to the Probe is high, and reflected power from the Probe to the BEG is low, the result is a low Voltage Standing Wave Ratio (VSWR), maximized electromagnetic field strength, and optimized treatment of mineral salts such as calcium sulfate (CaSO4), barium sulfate (BaSO4), strontium sulfate (SrSO4), calcium carbonate (CaCO3), and silicon dioxide (SiO2), etc.

Forward and reflected radio frequency power are measured by RF detectors on the BEG, and the BEG's onboard microcontroller determines the VSWR values. Upon determination of the VSWR values, the BEG's microcontroller instructs the Probe's onboard microcontroller and impedance-matching circuitry to cancel the appropriate inductive and/or capacitive reactance from the Probe so that the BEG sees only a 50-ohm resistive load.

FIG. 2 shows an exemplary Electric field—Magnetic field Desalination System Probe provided by the present invention installed in a typical desalination block diagram. In a typical desalination plant, feed water is first pretreated to remove organic material, algae, and other particles. The feed water is pumped into a multimedia filter tank that includes stages of anthracites, sand, and gravel. After the feed water has paced through the multistage filter tank, the feed water flows through a microfiltration stage, removing all impurities except for dissolved salts, minerals and other microscopic biological containments such as bacteria, viruses, and parasites.

Before passing through the reverse osmosis membrane, the water passes through an E×B Probe provided by the present invention to soften precipitated mineral salts in the feed water, to help facilitate easier cleaning in each pressure vessel housing containing reverse osmosis membranes. The Seawater then passes through a cluster of pressure vessels that house the reverse osmosis membranes. The water permeates the membrane, leaving dissolved salts and minerals as brine in the membrane pores alongside any bacteria or viruses. After treatment, a quarter of the filtered water goes through a stage of remineralization, disinfection, and fluoridation and is stored in a portable (fresh) water tank. The portable water is then sent to the affiliated water authority for further treatment and consumption.

An Exemplary Description of a Probe's Ionic Cyclotron Frequency and Lorentz Force Using the magnetic field (B), the Ionic Cyclotron frequency ($f_{CR}$) of any positive scaling ions can be calculated where $$\omega = 2\pi f = \frac{z \cdot e \cdot B}{m},$$

and $$ICF=z\cdot e\cdot B/2\pi m$$

(z) is the number of positive or negative charges of the ions, (e) is the elementary charge, and (m) is the mass of the positive scaling ions. For example, a magnetic field (B) of 9.2 micro Tesla would produce ICF of approximately 7 Hz for Calcium. The ICF is directly proportional to the magnitude of the magnetic field (B). As a result, ICF will change if the applied magnetic field is not held constant. To accelerate and helically spin the positive scaling ions, the electric field (E) and the magnetic field (B) must always remain constant. Without a constant magnetic field (B), and correspondingly a constant ICF it is not possible 100% of the time to target specific positive scaling ions since ICF would change because of amplitude variations in the magnetic field caused by an unmatched impedance between the BEG and the Probe. The impedance matching circuitry between the Probe and the BEG guarantee a constant Electro-Magnetic field necessary to produce a to target any positive scaling ions.

Below is an example of a calcium ion ICF calculation.

$$\begin{array}{ll} e = 1.6020e^{-19} & \mathrm{A\cdot s} \\ z = 2 & \\ B = 9.2e^{-6} & \mathrm{kg/A\cdot s^2} \\ m = 40.078 & \text{Atomic Mass Unit (Dalton)} \\ m = 40.078 \times 1.66053878283e^{-27} & \mathrm{kg} \end{array}$$

$$f = \frac{z\cdot e\cdot B}{m\cdot 2\pi} = \frac{2\times 1.6020e^{-19}\times 9.2e^{-6}}{6.6551e^{-26}\times 2\pi} = 7.0493 \quad \mathrm{Hz}$$

The BEG produces constant electric and magnetic field amplitudes to accelerate and change the trajectory of positive scaling ions into a helical (cycloid) motion. Square, sinusoidal, and triangular modulating waveforms are also produce from 1 Hz to 5000 Hz that are superimposed on the carrier frequencies to treat the scaling ions. Scaling ions in the feed water of desalination plants can be effectively treated using the ICF modulating frequencies 900-928 MHz and 1800-1850 MHz, 2.4-2.48 GHz and 5.7-5.8 GHz set anywhere from 1 Hz to 1000 Hz, at 80-100% modulation depth.

The electric and magnetic field produces a Lorentz force on the positively charged scaling ions (q), travelling with velocity (v), in the presence of an electric field (E) and a magnetic field (B), where the Lorentz force, $$F=q[E+(v\times B)]$$

The positively charged ions produce a helical (cycloid) motion under the influence of the magnetic field. The helical motion radius is referred to as the gyro-radius or cyclotron radius. The gyro-radius is calculated from:

$$r_g = mv/qB$$

where (m) is the mass of the positive scaling ion, (v) is the velocity perpendicular to the direction of the magnetic field, (q) is the charge of the electric field, and (B) is the magnetic field.

The electric field (E) accelerates the ions until a constant drift velocity is reached. The drift velocity can be calculated from:

$$v_d = \mu E,$$

where ($v_d$)=drift velocity, (E) is the electric field, and (μ) is the Electrical mobility. Electrical mobility is proportional to the net charge of the cations and/or anions, and its magnitude is the charge of the cations and/or anions.

An Exemplary Description of a Broadband Electromagnetic Generator

Figure 2:
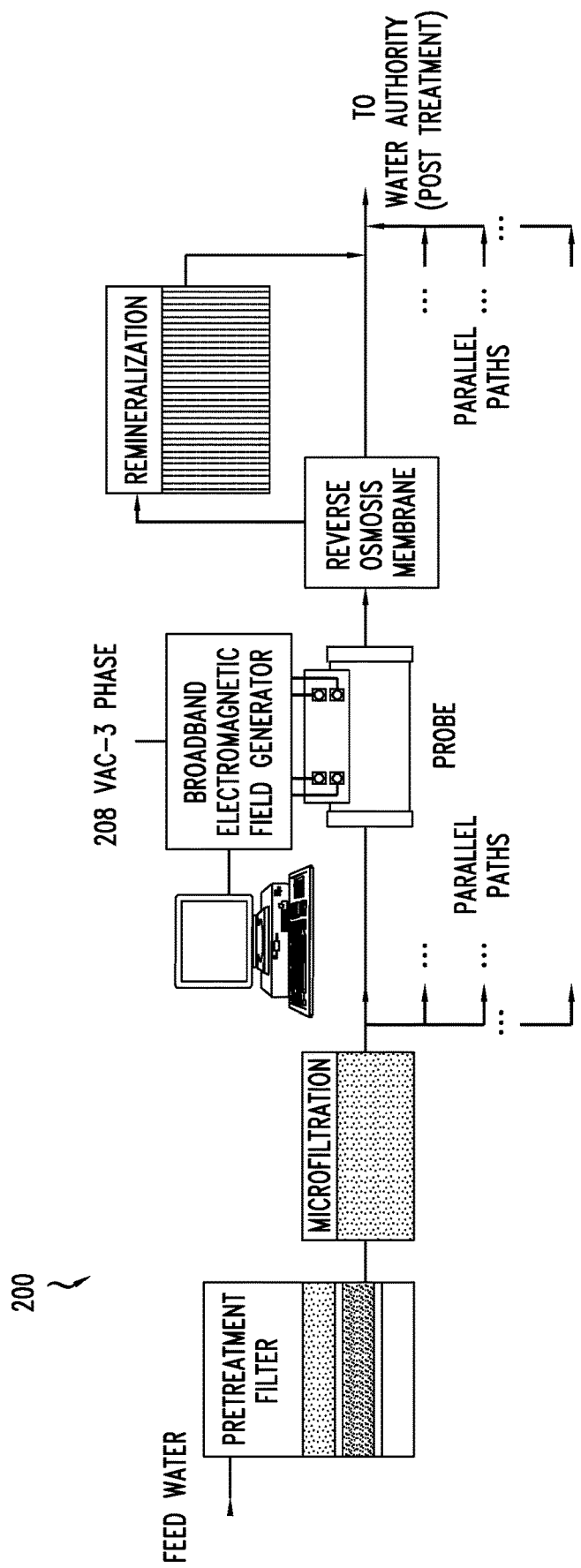
FIG. 2 depicts an exemplary electromagnetic, desalination system probe according to an embodiment of the invention.

Broadband electromagnetic generators (BEG) provided by the present invention may operate at frequency bands from 900-928 MHz, 1800-1850 MHz, 2.4-2.48 GHz and 5.7-5.8 GHz and has four (4) 50-ohm output impedance ports. The BEG is connected to an exemplary 50-ohm impedance matching circuitry with four (4) short 50-ohm coaxial transmission cables as in the E×B Desal System Configuration Diagram, FIG. 2. With the BEG's set to the aforementioned operating carrier frequencies, selected modulating frequency waveforms, and ICFs, the E×B Desal System prevents and mitigates of mineral salts such as calcium sulfate (CaSO4), barium sulfate (BaSO4), strontium sulfate (SrSO4), calcium carbonate (CaCO3), and silicon dioxide (SiO2), etc., by targeting the scaling ions and keeping the scaling ions in a cycloid motion. Furthermore, the Lorentz force is exerted on the precipitated mineral salts which weakens their morphology from a hard needle-like crystalline form of mineral scale to a softer form that does not stick to the RO membranes and reduces the pressure on RO membrane surfaces and stops the RO membranes and desalination pipes from being clogged.

The BEG includes the following sub-circuitries, circuitry and modules: AC to DC power supply module, RF preamplifier and Amplifier module, Detector Directional Coupler, Low Pass Filter, RF Current Sampler module, and a Microcontroller and Signal generator circuitry that contains the following sub-circuitries: Voltage/current generation circuitry, Thermal management circuitry, RF protection circuitry, Microcontroller and Signal generation circuitry, and Thermal protective components.

Figure 4A:
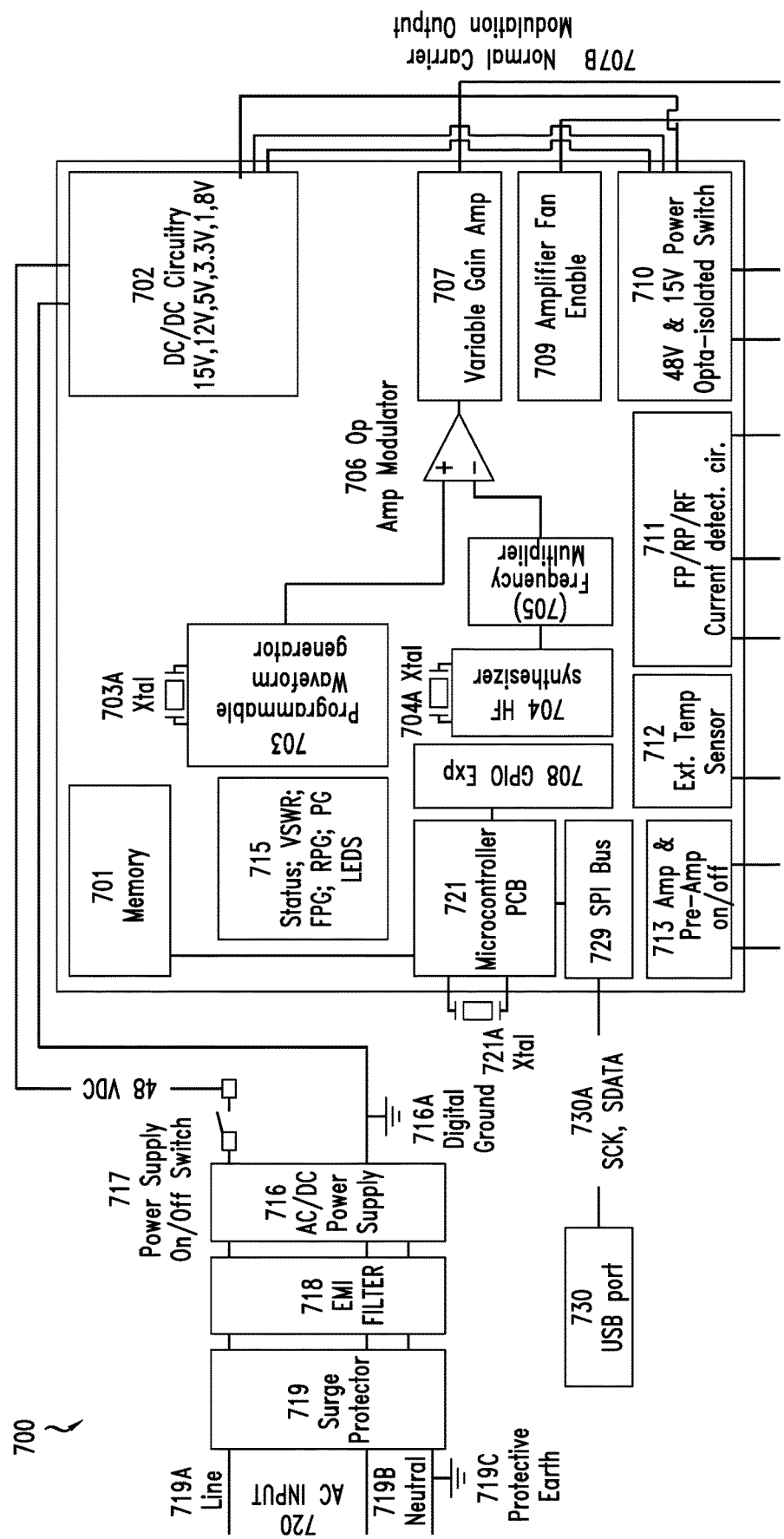
FIGS. 4A, 4B and 4C depict an exemplary broadband electromagnetic generator according to an embodiment of the invention.
Figure 4B:
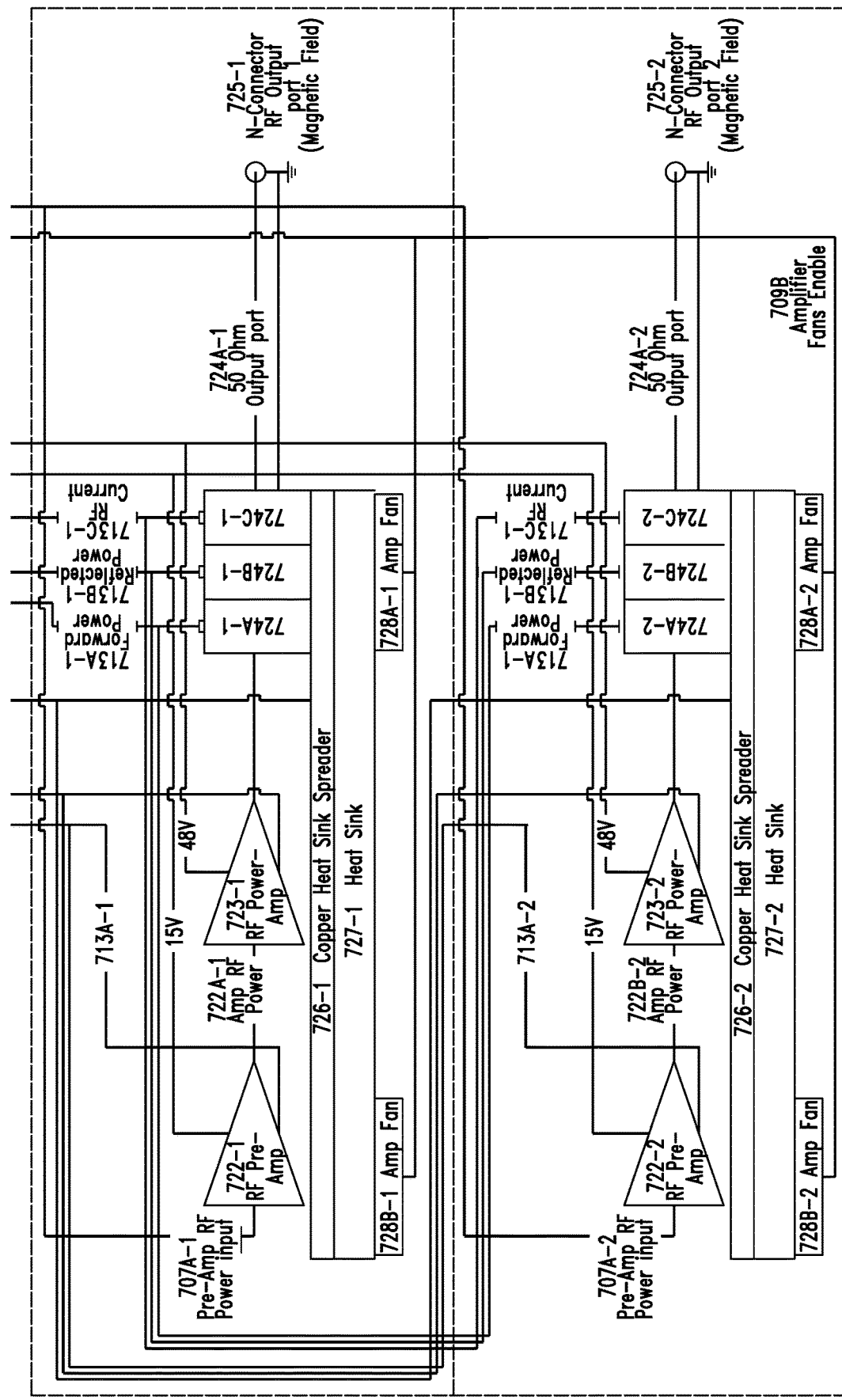
Figure 4C:
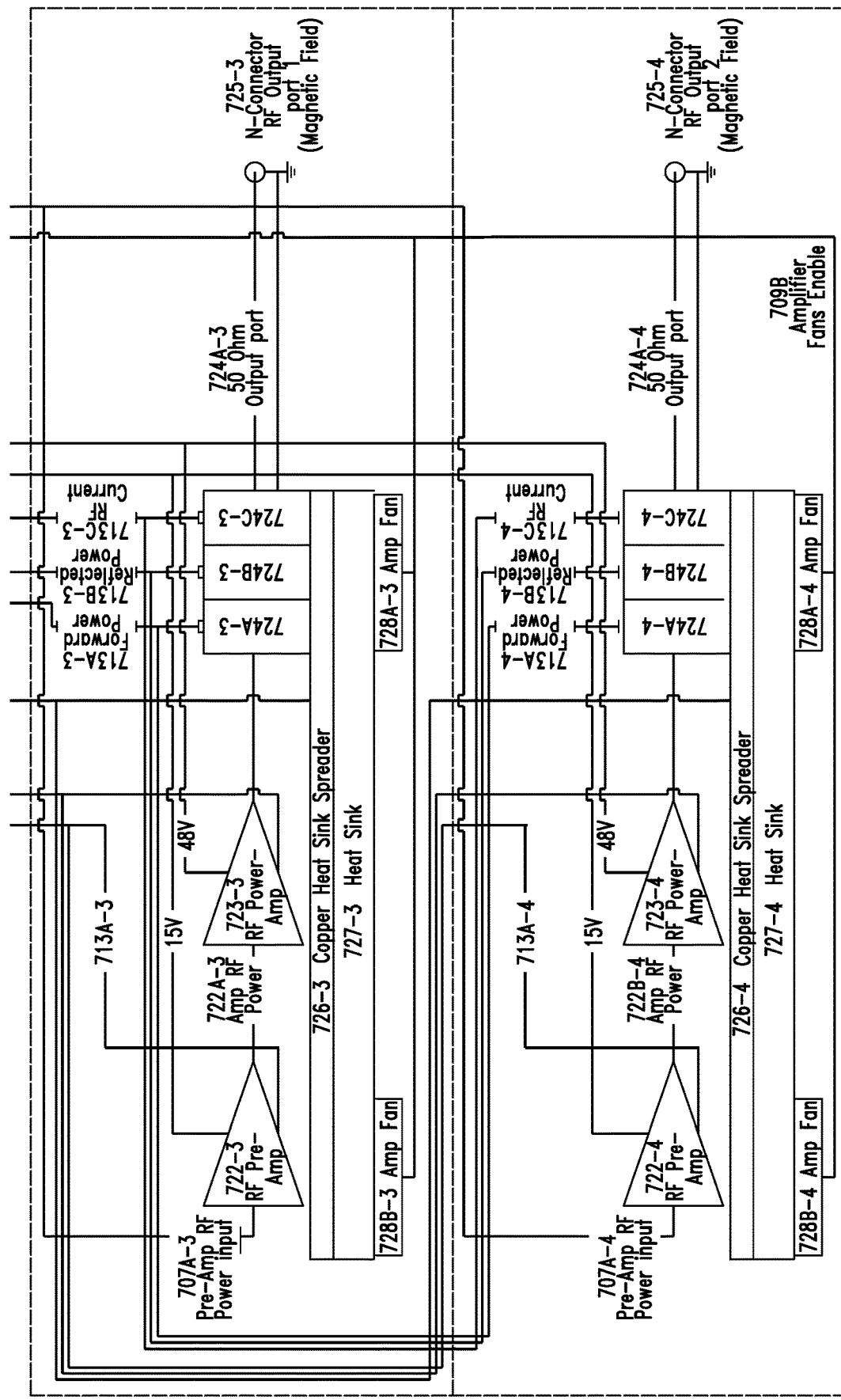

AC to DC Power Supply Module:

Referring now to FIGS. 4A, 4B and 4C there is depicted a simplified block diagram an exemplary BEG accordingly to an embodiment of the invention. As depicted the BEG may comprise an AC to DC power supply module [716] circuit is shown. The module [716] accepts AC power at its input receptacle [620]. A metal oxide varistor (MOV) [719] connected in parallel between the phase and the neutral conductors, protects the Generator from electric power utilities surge, voltage dips, variations, and brownout conditions. To reduce conducted emissions produced by the Generator on the AC power line, electromagnetic interference (EMI) filter [718] attenuates the conducted emissions to the Federal Communications Commission commercial regulated Class A limit. The phase and neutral conductors from the EMI filter [718] are connected to the AC power supply [716]. The AC power supply accepts 120-240 volts VAC power from power utilities and converts it to a 48V/60A DC power source. The 48 VDC power source is connected to an on/off switch, necessary to interrupt power to the DC-to-DC circuitry [702].

Voltage/Current Generation Circuitry:

The DC-to-DC circuitry [702] generates 15V/1.5A, 12 V/5A, 5V/1.5A, −5V/1.5A, 3.3V/0.5A and 1.8V/0.5A to power subsystem circuitry on the Generator. The DC-to-DC circuitry [710] contains a limiter to limit the inrush current from the power supply at start-up to 6.7A and normal operating conditions, to 23.5A. Under and over-voltage circuitry protects sensitive subsystem components such as the RF pre-amplifier and RF amplifier modules. The 48V and 15V source powers the RF power amplifiers [722-1, 722-2, 722-3, 722-4] and RF pre-amplifiers [723-1, 723-2, 723-3, 723-4] modules respectively. The modules are switched on and off with an opto-isolated switch [710] controlled by the DC-to-DC circuitry [702].

Thermal Management Circuitry

The DC-to-DC circuitry is also connected to the amplifier fan enable circuit that controls 8 fans, [728A-1, 728B-1, 728A-2, 728B-2, 728A-3, 728B-3, 728A-4 and 728B-4] mounted on the heat sink [727-1, 727-2, 727-3, 727-4]. The fans exhaust heat from the pre-amplifier and amplifier module heat sink and provide a high-temperature lockout condition input signal to the microcontroller [721]. The microcontroller [721] will shut down electrical power to the generator and protect it from thermal damage if it receives a high-temperature lockout. Thermal sensing is provided by a 5 kΩ negative coefficient thermistor (temperature sensor), mounted on the preamplifier and amplifier heat sink. Two comparators in the fan enable circuitry to monitor the temperature sensor. The first comparator switches on the fans, whenever the temperature at the sensor rises to about 110° F. and switches the fans off when the temperature drops about 5 degrees. A resistor in the fan enable circuitry introduces a small differential in temperature, to allow enough heat to be drawn away from the heat sink so that the fans will not stutter on and off as the heat stored in the heat sink core makes its way to the sensor mounted on the heat sink surface. The exact trip temperatures can be set in the microcontroller for the fan enable circuitry to perform its function.

RF Protection Circuitry

The generator has detector directional couplers, low pass filters, and RF current sampler modules [727] installed on the heat sinks [727]. The three outputs, namely forward power, reflected power and RF current. These three signals are conditioned by a low pass filter circuitry [711] and digitized by the analog to digital converter input on the microcontroller [721]. The microcontroller [722] calculates and determine a voltage standing wave ratio (VSWR) and provides a VSWR lockout signal to enable the amplifier during power startup, disable the amplifier on high VSWR condition, or disable the amplifier during shut-down. The VSWR lockout is programmed to trigger shutdown at a 3 to 1 VSWR condition.

Microprocessor and Signal Generator Circuitry

The microcontroller and signal generator circuitry contains an Atmel 16-bit microcontroller [721] with digital input and output ports, analog to digital converter input ports, and onboard memory [701]. Also in this circuitry are a serial peripheral interface (SPI) bus [729] and a universal serial bus (USB) port [730]. The circuitry contains a high frequency (HF) synthesizer [704] generating a sinusoidal carrier signal from 100 MHz to 500 MHz, whose output is then doubled by frequency multiplier [705] to produce 900-928 MHz, 1800-1850 MHz, 2.4-2.48 GHz and 5.7-5.8 GHz operating carrier frequencies. A programmable waveform generator [703] produces pulse, sinusoidal, square and triangular waveforms to modulate the carrier from 1 Hz to 5000 Hz. The multiplied output of the high-frequency synthesizer [705] and the output of the programmable wave generator [603] are combined using the operational amplifier [706] functioning as a modulator. The operational amplifier's modulated output is fed into variable gain amplifier [707], which generates a 50-ohm output modulated frequency carrier with a 0-dBm-power level, and a −0.25/+0.25 Vpp adjustable offset level with a modulation adjustment depth up to 100%. The output of the variable gain amplifier [707] is connected to the pre-amplifier's input ports [707A-1, 707A-2, 707A-3, 707A-4]. Control of the carrier frequencies, the percentage of modulations, modulation frequencies, modulation waveforms, output gains and offset levels are set and adjusted by the microcontroller [715].

Pre-Amplifier and Amplifier Module:

The pre-amplifiers [722-1, 722-2, 722-3, 722-4] are low noise amplifiers with a 500-ohm input and 50-ohm output port impedance operating at 15V/1A. The pre-amplifier has a maximum RF input power level of 0-dBm and a maximum output power of 5 W. The pre-amplifier output ports are connected directly to the input port of the amplifiers enabling the amplifier to produce 500 watts W of RF power each. The amplifiers [723-1, 723-2, 723-3, 723-4] are 500 watts broadband pallet amplifiers operating at 48V/17A. They also have 50-ohm input impedance port and a 50-ohm output impedance ports.

The amplifiers are based on a RF power MOSFET transistor providing high gain RF output power in a small footprint. The amplifiers have an advanced thermal tracking bias circuitry, which allows it to operate with a stable gain over wide temperatures for sustained periods of time. The output ports of the amplifiers are connected to the input ports of the Detector Directional Couplers, the Low Pass Filters and the RF Current Sampler modules [724-1, 724-2, 724-3, 724-4].

Detector Directional Coupler, Low Pass Filter and RF Current Sampler Module:

Detector Directional Coupler, Low Pass Filter and RF current Sampler module has three circuits as follows; a Detector Direction Coupler, a Low Pass Filter, and a RF current sampler.

The Detector Directional Coupler—is a combination of an RF detector and a directional coupler. The directional coupler is a quarter-wavelength, coaxial, with four ports; input, output, forward power and reflected power ports. The forward and reflected power output ports of the directional coupler are connected to two true power RMS RF power detector sensors. The RF power detector sensors provide both forward and reverse power linear voltages to the conditioning circuitry [711]. And then to the microcontroller's analog-to-digital converter inputs, where the VSWR is calculated, and a VSWR lockout condition is generated.

Low Pass Filter—The Low Pass filters are 5-pole Chebyshev filters to attenuate harmonics from the BEG's carrier frequencies comply to comply with the Class A radiated limits of the Federal Communications Commission's rules and regulations.

RF current sampler—The RF current sampler circuits [724-1, 724-2, 724-3, 724-4] uses the principle of RF current transformers to sample the RF current on the transmission line. The RF transmission lines from the amplifiers [723-1, 723-2, 723-3, 723-4] are the primary sides fed through wire wound ferrite toroidal coils. The wound coils are the secondary sides of the current transformers. The output signals from the wound toroidal coils are conditioned in circuitry [711] and then sent to the microcontroller's analog-to-digital converter input port, where the analog signal is digitized, and its value stored. The RF current value is monitored to protect against electrolysis of the desalination plant's piping system. If the RF currents are too high (greater than 2A), they could cause pinholes on the desalination plant's piping system. If the RF current are greater than 2A, the microcontroller with will reduce the amplifier's RF power to protect against electrolysis.

Thermal Protective Components:

The Thermal protective components are the heat sink, copper heat sink spreaders [726-1, 726-2, 726-3, 726-4] where the pre-amplifier and amplifier modules are installed to dissipate heat. Eight fans [728A-1, 728A-2, 728-3, 728-4] and [728B-1, 728B-2, 728B-3, 728B-4] are installed to exhaust the heat generated by the pre-amplifiers and amplifiers on the heat sinks.

An Exemplary Description of the 50-Ohm Impedance Matching Circuitry

Generally, a probe provided by the present invention may form a capacitor that can be considered an equivalent electrical circuit comprised of a capacitance (C), in parallel with a resistance (R). The capacitance, resistance and dielectric permittivity (e) of the liquid, for example water, flowing through such a probe forms a complex impedance represented by the following relationship:

$$Z^+ = R - j\omega^1/c$$

In the case where inventive probe provided by the invention utilizes cylindrical elements, the impedance (Z) of such a probe may be calculated using the relationship set forth below, where the impedance (Z) is proportional to the product of the inverse square root of dielectric permittivity of the water flowing through the probe, and the logarithmic ratio of the outer concentric and inner concentric electrodes (D) and (d) (e.g., positive and negative conductive elements) respectively:

$$Z = 138/(\sqrt{\varepsilon}) \times \mathrm{Log}(D/d)$$

The dielectric permittivity may be expressed as a complex number:

$$\varepsilon = \varepsilon' - j\varepsilon'',$$

where $\varepsilon'$ is the dielectric constant and $\varepsilon''$ is the dielectric loss factor. The dielectric loss factor is a function of conductivity and frequency, where $\varepsilon'' = \sigma/2\pi f$, and $\omega = 2\pi f$.

The dielectric permittivity may be further expressed as a function of the dielectric constant and the conductivity a as follows:

$$\varepsilon = \varepsilon' - j\sigma/\omega$$

The maximized applied voltage at the Probe's input ports produces a voltage between the Probe's inner and outer cylindrical electrodes in accordance with FIG. 1A. When the Probe's electrode radiuses are (a) and (b) respectively, and the length of the electrode is (I), the Voltage between the electrodes is:

$$V = Q/2\pi\varepsilon rl \cdot \ln(a/b)$$

The charge on the electrodes over a period (t) is (Q), and the charge per unit length $\lambda = Q/I$. Thus, the electric field (E) between the electrodes is: $E = Q/2\pi\varepsilon rl$, where $Q = \lambda l$, and $E = \lambda/2\pi\varepsilon r$.

The electric field (E) causes calcium cations and bicarbonate anions to rapidly move back and forth between the negative-charged cylindrical electrode and the positive-charged cylindrical electrode. This rapid back-and-forth movement promotes bulk precipitation of desalination plant's mineral scale.

The Electro-Magnetic field produces an electric field (E) and a magnetic field (B). The magnetic field (B) is governed by the Ampere-Maxwell Law and is responsible for a displacement current (I_d) which flows through an imaginary cylindrical surface (S), with a length (l) and radius (r), as shown in FIG. 1A.

The current flowing from the Probe's outer cylindrical electrode to the inner cylindrical electrode crosses surface (S), where $S = 2 \cdot \pi \cdot l \cdot r$.

Gauss's Law is responsible for the Electric flux density $(D) = \varepsilon\_o \cdot \varepsilon\_r \cdot E$, hence, the displacement current $I\_d = \partial D / \partial t \cdot S = \partial / \partial t \cdot (D) \cdot (2\pi \cdot r \cdot l)$ From which the magnetic field (B) can be calculated because of (I_d), where $B (= \mu\_o \, I\_d)/2\pi r$ When the impedance of an inventive probe is different from that of a connected electromagnetic waveform generator and transmission medium (e.g., conductive cable) a "mismatch" is said to exist. When this occurs, some of the RF energy sent from the generator to the probe may be reflected by the probe, back down the transmission line, and into the generator. If the so reflected energy is strong enough, it can prevent the generator from operating correctly, and possibly ruin the generator. Further, mismatched impedances adversely affect the ability of the inventive probes to effectively treat unwanted material in a liquid because such mismatched impedances are believed to cause the amplitude of the electric field applied to the liquid to vary as well as cause the magnetic field applied to the liquid to vary. Such variations in the amplitude of the electric and magnetic fields result in a decrease in the forces that are applied to unwanted material, as explained further herein.

In contrast, when a broadband electromagnetic generator, transmission medium and probe are connected and each has the same impedance, the three components are said to be impedance "matched". When so matched, the amount of reflected RF energy may be minimized thus allowing a maximum amount of RF energy to be transferred from the generator to the probe. Yet further, matched components insure a constant amplitude of the electric and magnetic fields that result in optimum forces being applied to unwanted material, as explained further herein.

Figure 5:
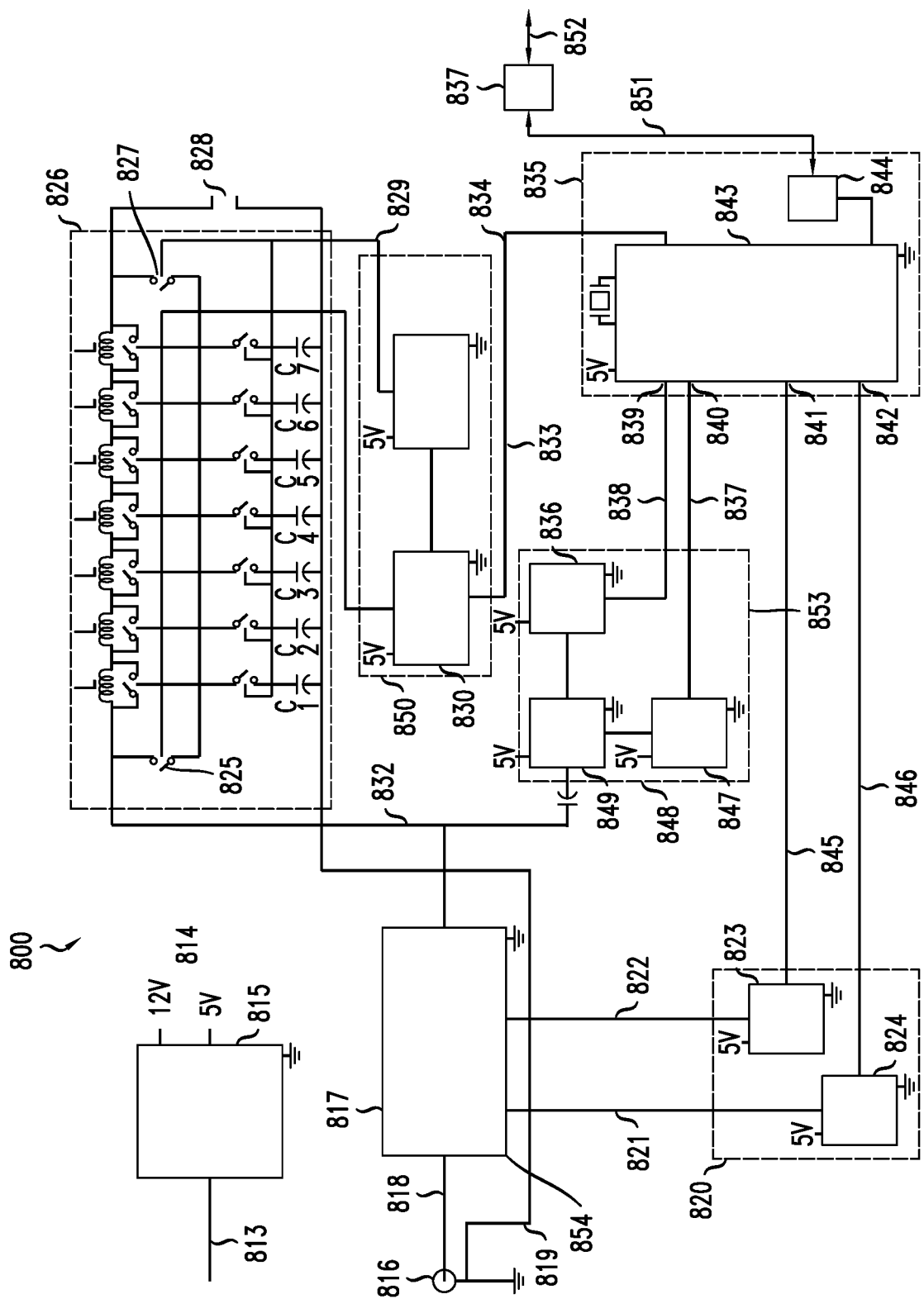
FIG. 5 depicts an exemplary electromagnetic probe that includes impedance matching circuitry according to an embodiment of the invention.

To eliminate the issue of mismatched impedances (i.e., to match impedances), the present inventors provide a smart probe control system, such as exemplary system 800 depicted in FIG. 5 that insures elements are impedance matched (e.g., generator, connecting cables, and probe, etc.,). System 800 or one or more of the elements of system 800 may be referred to as impedance matching circuitry. Regarding FIG. 5 and the description that follows, it should be understood that each probe or probe section may be controlled by a separate smart probe control section that includes impedance matching circuitry, as explained in more detail below. For the sake of efficiency, the description that follows will be directed at a control section and impedance matching circuitry that can be applied to each type of probe or probe section.

Generally speaking, impedance matching circuitry according to embodiments of the invention may be operable to maintain an impedance of a probe, signal generator and a transmission medium connecting the probe and generator at a matched impedance, and maintain a constant amplitude of an electric field created by an electric filed dominant probe (or electric field section) and a constant amplitude of a magnetic field created by a magnetic field dominant probe (or probe section).

In more detail, the ratio of forward RF energy (power) to reflected RF energy (power) is known as VSWR. VSWR is an important parameter used to calculate the amount of RF energy that may be transferred to a probe and the amount of reflected energy that the probe does not receive. VSWR is typically the most important parameter for matching the impedance of a generator, transmission medium and probe. For example, a VSWR of 1.0:1 indicates a perfect match. As more energy is reflected, the VSWR may (undesirably) increase to 2.0:1, 3.0:1, or higher.

In one embodiment, a VSWR of 1.5:1 or less is most effective in the treatment of liquids that contain scale. Furthermore, a VSWR of 1.5:1 or less may prolong a generator's mean time between failures (MTBF) and make it more energy efficient.

The smart probe control system 800 may include a control device 843 (e.g., microcontroller, microprocessor, or controller collectively "microcontroller" for short). The microcontroller 843 may be connected to the positive and negative terminals of the electric field antennas and magnetic field antennas of a probe provided by the present invention that may have a fixed impedance of 50 Ohms, for example (not shown in FIG. 8). To achieve and maintain a VSWR of 1.5:1 or less, the microcontroller 843 may be operable to automatically measure both the forward RF energy/power (F) and reflected RF energy/power (R) of the positive and negative conductive elements, respectively. From such measurements, the microcontroller 843 may be operable to compute a VSWR based on the following relationship:

$VSWR = (1 + \sqrt{(R/F)})/(1 - \sqrt{(R/F)})$

The microcontroller 843 may be operable to store the computed VSWR values as so-called "look up tables" in onboard memory or in associated memory (not shown in FIG. 5). Upon computing a VSWR value, the microcontroller 843 may be further operable to account for the effects of a given probe's reactance by controlling an impedance tuning section 825 to 829 to select (e.g., adding, subtracting) an appropriate capacitance to cancel out an inductive reactance, and/or select an appropriate inductance to cancel out capacitive reactance.

System 800 may also include a directional coupling section 817 that is operable to receive an RF signal from an electromagnetic waveform generator 403 and provide forward and reflected power to two RF power sensors 823, 824. RF power sensors 823, 824 may be operable to provide both forward and reverse power linear voltages to the microcontroller 843 via analog-to-digital converter inputs of the microcontroller 843 in order to allow the microcontroller 843 to compute a VSWR based on the forward and reflected voltages.

System 800 may further comprise an impedance tuning section 825 to 829, polyimide, epoxy glass, alumina ceramic, or silicon dioxide are used as printed circuit board dielectrics to create the banks of fixed distributed transmission line network capacitors and inductors. The banks include fixed distributed network capacitors $C_1$ to $C_n$ and fixed distributed network inductors $L_1$ to $L_n$ (where "n"

denotes the last capacitor or inductor in a bank) the tuning section is created using any of the following, MOSFET shift registers 830, 831 and high frequency microwave switch 825, 827. The microcontroller 843 may be operable to configure the tuning section 825 to 829 by, for example, selecting a combination of capacitors and inductors and selecting either the low impedance or the high impedance high frequency microwave switch 825, 829, respectively, to achieve an appropriate VSWR (e.g., low or lowest VSWR).

A signal output from the directional coupling section 832 may be sent to a power limiting section 853 that is operable to reduce the power of the signal, convert the signal to a square wave and feed the so converted signal to a divide by 256-frequency counter 836. The signal output from counter 838 may be sent to a digital input port 839 of the microcontroller 843.

As mentioned before the impedance matching circuitry may be designed to cancel the inductive and/or capacitive reactance components of a probe provided by the present invention so that the only remaining portion of the probe's impedance, (Z), is the 50-ohm resistive component. For example, upon determination of the VSWR values, the microcontroller 843 may be operable to instruct the tuning section 825 to 829 to select a combination of capacitors and inductors to achieve an appropriate VSWR (e.g., low or lowest VSWR). to cancel the appropriate inductive and/or capacitive reactance of the probe provided by the present invention so that only a 50-ohm resistive load is applied to a generator provided by the present invention.

A "wake-up" signal generating section 847 may also be included. Section 853 may be operable to place the microcontroller 843 in a "sleep" mode when the microcontroller 843 is not required to compute a VSWR (e.g., when a previously computed VSWR stored in a look-up table is used), and to "awaken" the microcontroller 843 from a sleep mode in order to prompt the microcontroller 843 to compute a VSWR, for example.

In one embodiment of the invention, the microcontroller 843 may be operable to store specialized instructions (e.g., firmware) in a memory, where the specialized instructions may be used to configure the tuning section 825 to 829. One such configuration may be used to, for example, minimize the number of tuning adjustments. For example, in one embodiment, the microcontroller 843 may access stored, specialized instructions to complete coarse tuning. In such a case, the microcontroller 843 may be operable to send a signal to deactivate the high impedance high frequency microwave switch 825 if necessary, and then control the operation of MOSFET shift registers 830, 831 to select an individual inductor $L_1$ to $L_n$ to determine a matching impedance. Upon selection of a set of inductors $L_1$ to $L_n$, the microcontroller 843 may then be operable to select capacitors $C_1$ to $C_n$ that are associated with a matching impedance, and compute VSWRs. If, upon making such computations, an appropriate VSWR is not computed, the microcontroller 843 may be operable to activate the low impedance high frequency microwave switch 827, and then repeat the selection of inductors $L_1$ to $L_n$, capacitors $C_1$ to $C_n$ and computations.

In one embodiment, upon completion of coarse tuning, the microcontroller 843 may be further operable to complete "fine" tuning of the previously selected inductor and capacitor combinations by further selecting (or de-selecting) such inductors/capacitors, and computing VSWRs to determine whether a desired VSWR or a VSWR of 1.5:1 or lower can be obtained.

In a further embodiment of the invention, system 800 (e.g., microcontroller 843) may be operable to continuously compute VSWR values and compare such computed values to a stored reference VSWR (e.g., 1.5:1). When a comparison indicates a computed VSWR is greater than the stored reference, the microcontroller 843 may initiate or repeat further coarse and fine tuning sequences. Otherwise, the microcontroller 843 may not initiate or repeat such tuning.

In this manner, the overall impedance of an electrical circuit comprising a generator, transmission medium (e.g., cable) and probe can be matched. Further, the amplitude of the electric and magnetic fields can be maintained at a substantially constant level. Because the amplitudes of the electric and magnetic fields are held constant, the applied electric and magnetic fields will be able to apply optimum Lorentz type forces to unwanted material in a liquid at a corresponding ionic cyclotron frequency of the unwanted material.

An Exemplary Description of a Plasma Treatment System

If desirable the systems describe above may be combined with a plasma probe (hereafter referred to as an "EMAP system" or "EMAP probe").

Figure 1B:
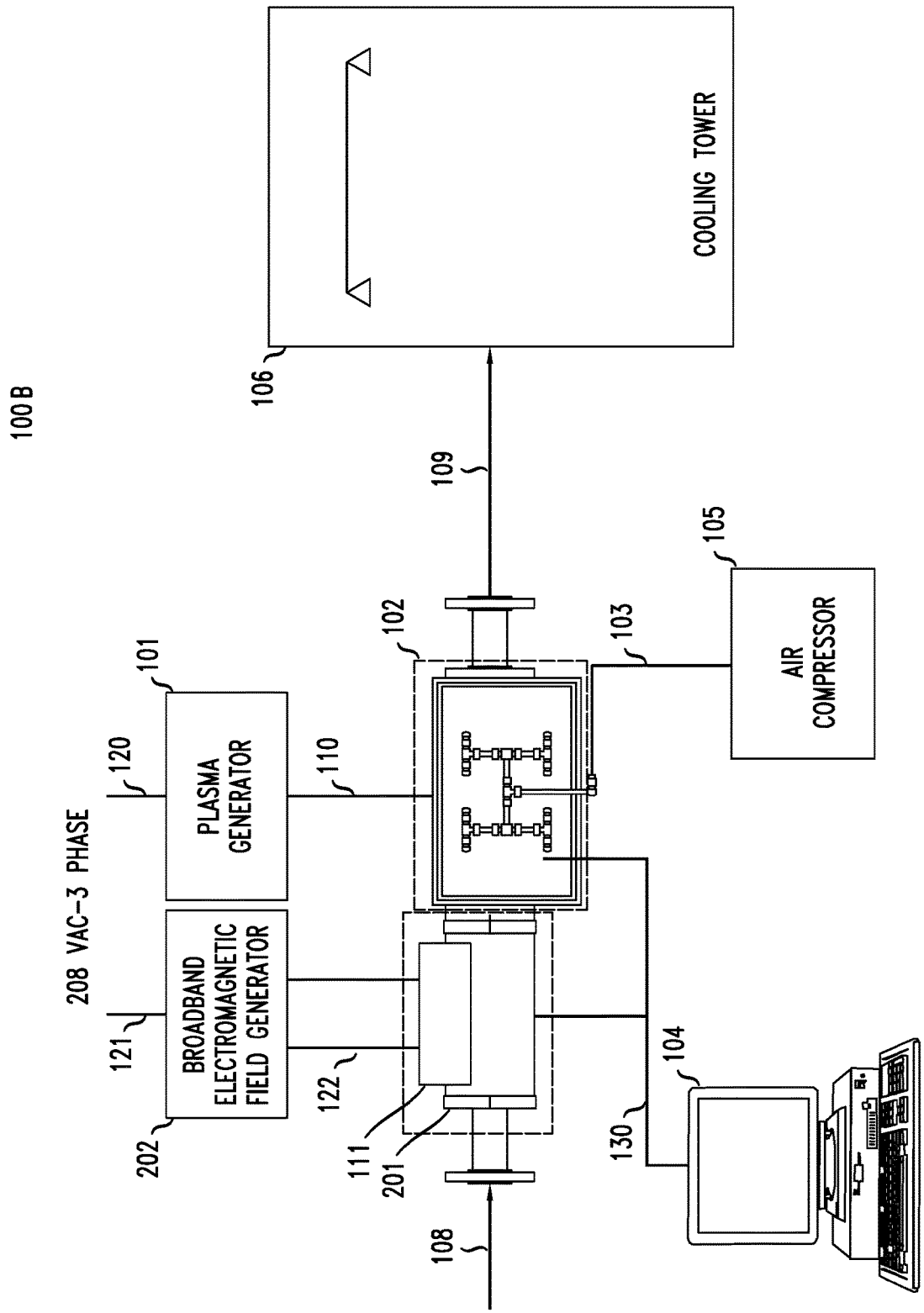
FIG. 1B depicts an exemplary electromagnetic and plasma probe according to an embodiment of the invention.

Referring to FIG. 1B, an exemplary EMAP probe system designed to generate non-thermal plasma micro-discharge filaments (hereafter refer to as "Plasma streamers") in combination with an Electro-Magnetic field to treat and or mitigate scale such as calcium carbonate, calcium sulfate, magnesium carbonate, and silica, biological contaminants, (biofilm, *Legionella* bacteria, etc.) and biologically induced corrosion in desalination plants, oil field installations, and large data centers feed water is shown.

The EMAP probe system has two sections, a Plasma section and an Electro-Magnetic section. Preceding the Non-Thermal Plasma section of the EMAP probe, is the Electro-Magnetic probe section, which generates a simultaneously applied time varying modulated electric and magnetic fields, perpendicular to each other, that assists in the treatment and or mitigation of scale, biological contaminants, (biofilm, *Legionella* bacteria, etc.), and biologically induced corrosion.

The simultaneously applied time varying modulated electric and magnetic fields are believed to cause the ions to simultaneously accelerate (i.e., speed up) and vibrate or otherwise move in a spiral, helical or cycloid motion. The net result is that the scale remains soluble in the desalination plants, oil field installations, and large data centers seawater or feed water prior to entering the Plasma section of the EMAP probe, where reactive and molecular species are produced to further treat and or mitigate scale, biological contaminants, (biofilm, *Legionella* bacteria, etc.), and biologically induced corrosion.

The applied time varying modulated electric fields also has the capability to prevent and or eliminate biological contamination in the desalination plants, oil field installations, and large data centers seawater or feed water by applying a 1.5 kHz-5 kHz modulated square wave pulse that effectively denatures biofilm and biological contaminants. Additionally, the time varying modulated magnetic fields also prevent and or eliminate corrosion in the desalination plants, oil field installations, and large data centers seawater or feed water when the ionic cyclotron frequency of iron (Fe) is applied.

The Plasma streamers produced by the EMAP probe system initiate energetic electrons, and space charge accumulation, which produces reactive (ionic and excited atomic) species and molecular species. These reactive species and molecular species are characterized by electron avalanche, rotational and gravitational excitation, dissociation, and ionization processes with energies up to 20 electron Volt (eV).

Specifically, the rotational and vibrational excitation of the desalination plants, oil field installations, and large data centers saltwater or feed water occurs below 1 eV energy threshold, while the electron avalanche producing various charge particles (electrons, positive ions, negative ions, complex ions, etc.) occurs between 5 eV to 20 eV energy threshold. The disassociation of reactive and molecular species of the desalination plants, oil field installations, and large data centers saltwater or feed water is between 8 eV and 9 eV, and ionization of the desalination plants, oil field installations, and large data centers saltwater or feed water occurs around a threshold of approximately 13 eV to 14 eV.

The Rotational and vibrational excitation, electron avalanche, dissociation, and ionization processes further initiate chemical reactions that include Hydroxyl (OH), Hydrogen (H), Oxygen (O), Hydrogen Peroxide (H2O2), Hydronium (H3O), Super Oxide anion ('O2-), Singlet Oxygen ($^1$O2) ions, Ozone (O3) and Ultra Violet light.

Scale formation occurs in a desalination plants, oil field installations, and large data centers when highly soluble and naturally occurring Calcium ions ($Ca^{2+}$) and Bicarbonate (HCO3) ions precipitate into Calcium Carbonate (CaCO3) and Carbon Dioxide (CO2) gas as a result of temperature, pressure and pH changes in the desalination plants, oil field installations, and large data centers saltwater or feed water. The Plasma section of the EMAP probe has several Plasma streamers mechanisms to treat and or mitigate scale, biological contaminants, (Biofilm, *Legionella* bacteria, etc.), and biologically induced corrosion. The Plasma streamers mechanisms are as follows:

Hydrogen (H) ions are produced by direct ionization of the desalination plants, oil field installations, and large data centers saltwater or feed water molecule as a result of Plasma streamers, which react with Bicarbonate ions (HCO3) present in the desalination plants, oil field installations, and large data centers saltwater or feed water to produce additional Water (H2O) and Carbon Dioxide gas (CO2) shown in EQ. 3 below.

 Eq. 1

 Eq. 2

 Eq. 3

Thus, by removing Bicarbonate ions from the desalination plants, oil field installations, and large data centers saltwater or feed water, the EMAP probe Plasma section eliminates the propensity for scale to form on the desalination plants, oil field installations, and large data centers heat exchanger elements and the inside of pipe walls. Plasma Streamers Mechanism 2, Biological contaminants and biologically induced corrosion treatment through Ozone generation: The EMAP probe Plasma section treats biological contaminants, (Biofilm, *Legionella* bacteria, etc.) and biologically induced corrosion in the desalination plants, oil field installations, and large data centers saltwater or feed water with Ozone. The Plasma streamers production of Ozone (O3) gas is by electron impact dissociation of molecular Oxygen (O2) and molecular Nitrogen (N2) of the carrier gas entering the EMAP probe. The Plasma streamers produce Ozone from the carrier gas, which can be ambient air or dry air supplied by compressor in which the molecular Oxygen (O2) gas reacts with an Oxygen atom from the carrier gas. The Ozone gas produced to treat biological contaminants and biologically induced corrosion dissolves into the desalination plants, oil field installations, and large data centers saltwater or feed water.

Plasma Streamers Mechanism 1, Scale treatment through Hydrogen ion generation: The EMAP probe Plasma section treat scale by ionization of the desalination plants, oil field installations, and large data centers saltwater or feed water by producing Hydrogen ions to remove bicarbonate ions. From Equation 1 below, positive ions attach to the desalination plants, oil field installations, and large data centers saltwater or feed water molecule to produce Oxoniumyl ($H2O^+$). Oxoniumyl ($H2O^+$) further attaches with the desalination plants, oil field installations, and large data centers water molecule to produce Hydronium ($H3O^+$) and Hydroxyl (OH).

Plasma Streamers Mechanism 3, Scale treatment through Nitric Oxide generation: The EMAP probe Plasma section treat scale by ionization of the desalination plants, oil field installations, and large data centers saltwater or feed water by producing Hydrogen through the disassociation of Nitric acid (HNO3) which then disassociate to Hydrogen ($H^+$) ions and Nitrate (NO3) ions to remove bicarbonate ions. The carrier gas entering input port of the EMAP probe comes in contact with the desalination plants, oil field installations, and large data centers saltwater or feed water where it is ionized and disassociated to molecular Nitrogen (N2) gas and molecular Oxygen (O2) gas. Both molecular Nitrogen (N2) gas and molecular (O2) gas further reacts with Nitrogen atoms and Oxygen atoms to produce Nitric Oxide (NOX) gas. The Oxygen atom from the carrier gas oxidizes Nitrate (NOx) to Nitrogen dioxide (NO2). The Nitrogen dioxide (NO2) in the desalination plants, oil field installations, and large data centers saltwater or feed water result in Nitric acid (HNO3). Nitric acid (HNO3) is then disassociated to Hydrogen ($H^+$) ions and Nitrate (NO3) ions. The Hydrogen ions produced from Nitric acid contributes further to the removal of bicarbonate ions to treat and or mitigate scale.

 EQ. 4

 EQ. 5

Plasma Streamers Mechanism 4, biological contaminants and biologically induced corrosion treatment through Hydrogen Peroxide generation: The EMAP probe Plasma section treats biological contaminants, (biofilm, *Legionella* bacteria, etc.) and biologically induced corrosion in the desalination plants, oil field installations, and large data centers saltwater or feed water with hydrogen peroxide. The Plasma streamers production of hydrogen peroxide by electron impact is initiated by the disassociation of vibrational excited molecules, whereby excited desalination plants, oil field installations, and large data centers saltwater or feed water (H2O*) molecules decompose in EQ. 6. The excited desalination plants, oil field installations, and large data centers saltwater or feed water molecules (H2O*) reacts with the desalination plants, oil field installations, and large data centers saltwater or feed water (H2O) molecule to produce Hydrogen ions (H), Hydroxyl ions (OH), and additional water (H2O). The reaction in EQ. 7 further propagate further reactions of vibrationally excited molecules in Equation 8 and Equation 9 to produce Hydrogen peroxide H2O2.

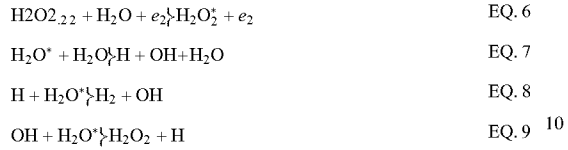

$$H2O2_{2,2} + H_2O + e_2 \} H_2O_2^* + e_2 \quad \text{EQ. 6}$$

$$H_2O^* + H_2O \} H + OH + H_2O \quad \text{EQ. 7}$$

$$H + H_2O^* \} H_2 + OH \quad \text{EQ. 8}$$

$$OH + H_2O^* \} H_2O_2 + H \quad \text{EQ. 9}$$

We claim:

1. A method for treating water comprising:
applying electromagnetic fields to water within a desalination plant's circular piping system using an electromagnetic probe thereby changing a morphology of precipitated mineral scale in the water from hard scale to soft scale, wherein the applied fields comprise attenuation losses in the range of 1 dB/100 meters to 2 dB/100 meters.

2. The method as in claim 1 further comprising:
reducing a precipitation of supersaturated salts within the water by applying the electromagnetic fields at an ionic cyclotron frequency associated with scaling ions within the water, thereby keeping the scaling ions in a cycloid movement and weakening their ability to precipitate from a hard needle-like crystalline form of mineral scale to a softer form.

3. The method as in claim 1 further comprising generating non-thermal plasma streamers using a plasma system to treat and or mitigate at least scale, biological contaminants, biofilm, *Legionella* bacteria and biologically induced corrosion in the desalination plant.

* * * * *